(12) United States Patent
Dill (10) Patent No.: US 12,088,333 B2
(45) Date of Patent: Sep. 10, 2024

(54) PHONE HOLDER WITH MOUNTING BRACKET

(71) Applicant: Allen Dill, Middletown, DE (US)

(72) Inventor: Allen Dill, Middletown, DE (US)

( * ) Notice: Subject to any disclaimer, the term of this patent is extended or adjusted under 35 U.S.C. 154(b) by 0 days.

(21) Appl. No.: 18/055,474

(22) Filed: Nov. 15, 2022

(65) Prior Publication Data

US 2023/0412207 A1 Dec. 21, 2023

Related U.S. Application Data

(60) Provisional application No. 63/345,620, filed on May 25, 2022.

(51) Int. Cl.
*H04B 1/3888* (2015.01)

(52) U.S. Cl.
CPC .................................. *H04B 1/3888* (2013.01)

(58) Field of Classification Search
CPC .................................................... H04B 1/3888
See application file for complete search history.

(56) References Cited

U.S. PATENT DOCUMENTS

| | | | |
|---|---|---|---|
| 6,073,318 A * | 6/2000 | Phillips | G08B 3/1058 24/3.12 |
| 6,168,057 B1 | 1/2001 | Schwabe | |
| 10,376,037 B1 | 8/2019 | Brasfield | |
| 10,480,711 B1 * | 11/2019 | Tran | A45F 5/02 |
| 2005/0255898 A1 * | 11/2005 | Huang | H04B 1/3877 455/575.8 |
| 2010/0288804 A1 * | 11/2010 | Youssefi-Shams | A45F 5/021 224/676 |
| 2013/0200117 A1 * | 8/2013 | Monro | A45F 5/02 224/183 |
| 2017/0122701 A1 * | 5/2017 | Lim | F41C 33/0236 |
| 2019/0037166 A1 * | 1/2019 | Davis | A45C 13/1092 |
| 2019/0246776 A1 * | 8/2019 | Tran | F16M 13/04 |
| 2020/0100548 A1 | 4/2020 | Blair | |

* cited by examiner

*Primary Examiner* — Yuwen Pan
*Assistant Examiner* — Fatuma G Sherif
(74) *Attorney, Agent, or Firm* — Boudwin Intellectual Property Law, LLC; Daniel Boudwin (57) ABSTRACT

A phone holder with a mounting bracket that secures to a garment via fasteners integrated with the garment. The mounting bracket can include fasteners that secure to corresponding receivers in the garment. The fasteners may include military pin fasteners. The phone holder can be removably connected to the mounting bracket. The phone holder includes a clip that removably secures to the bracket, such that the user can remove the holder and the supported phone when needed. The phone holder may also be formed with the mounting bracket as an integral part of the holder. The mounting bracket is configured to allows the phone holder to be attached securely and directly to the wearer, so that the camera of a cell phone secured within the holder can be utilized as a body-worn camera.

3 Claims, 9 Drawing Sheets

PHONE HOLDER WITH MOUNTING BRACKET

CROSS REFERENCE TO RELATED APPLICATIONS

This application claims the benefit of U.S. Provisional Application No. 63/345,620, filed on May 25, 2022. The above identified patent application is herein incorporated by reference in its entirety to provide continuity of disclosure.

BACKGROUND OF THE INVENTION

The present invention relates to a phone holder. More specifically, the present invention provides a phone holder with a mounting bracket that secures to a garment via fasteners integrated with the garment, which allows the phone holder to be attached securely and directly to the wearer, so that the cell phone camera can be utilized as a body camera.

Police and other law enforcement officers are usually required to wear some sort of body camera. The body camera records their surroundings continuously for various purposes, including safety, officer compliance monitoring, and evidence recording, to name a few. Some agencies utilize dedicated body camera devices that secure to clothing via fasteners. However, these devices are typically very expensive and also bulky, making them difficult to wear properly. Some municipalities have issued both cell phones and body cameras, but the additional drain on financial resources is undesirable. Other municipalities are trying to accomplish the same goal of using a cellphone as a body camera with significantly inferior products.

There is an ongoing struggle to find the appropriate phone holder for law enforcement and military that allows the phone to be utilized as a body cam. The present invention provides an improved solution. The phone holder with mounting bracket can be produced for less cost than traditional body cams on the market, by utilizing a cell phone with a camera. Municipalities have been reluctant to use a cell phone due to the lack of adequate holders, but now there is a cell phone holder to do the task. The present invention includes a mounting device attachable directly to an article of clothing, such that the phone holder can be quickly and securely installed within the mounting device. This allows individuals to utilize the cell phone camera as a body camera with ease.

In light of the devices and systems disclosed in the known art relating to phone holders and bodily-worn cameras, it is submitted that the present invention substantially diverges in design elements from the known art and consequently it is clear that there is a need in the art for an improvement to existing cell phone holders and mounting devices, particular with regard to body-worn cameras. In this regard the present invention substantially fulfills these needs.

SUMMARY OF THE INVENTION

The present invention provides a phone holder with a mounting bracket wherein the same can be utilized for securing a cell phone to a garment such that the cell phone camera can be used as a body camera. The present invention generally includes a holder comprising a base, a front wall, a rear wall, a pair of sidewalls, and an upper opening defining a pocket having an interior volume configured to receive a cell phone therein. A mounting bracket includes fasteners that are configured to secure the mounting bracket and the phone holder to a garment. In one embodiment, the mounting bracket is disposed on the rear wall of the holder. In another embodiment, the mounting bracket includes a pair of attachment members and a retaining member extending across the pair of attachment members defining a slot. In this embodiment, a clip affixed to the rear wall of the holder is configured to removably engage the slot of the mounting bracket to removably secure the holder to the mounting bracket. Both embodiments allow individuals to secure the phone holder and a phone stored therein to the garment they are wearing in order to use the phone's camera as a body camera.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. Like reference numerals are used throughout the drawings to depict like or similar elements of the phone holder and mounting bracket. For the purposes of presenting a brief and clear description of the present invention, a preferred embodiment will be discussed as used for providing a mounting system for securing a cell phone to a garment in order to utilize the cell phone's camera as a bodily-worn camera. The figures are intended for representative purposes only and should not be considered to be limiting in any respect.

Figure 1:
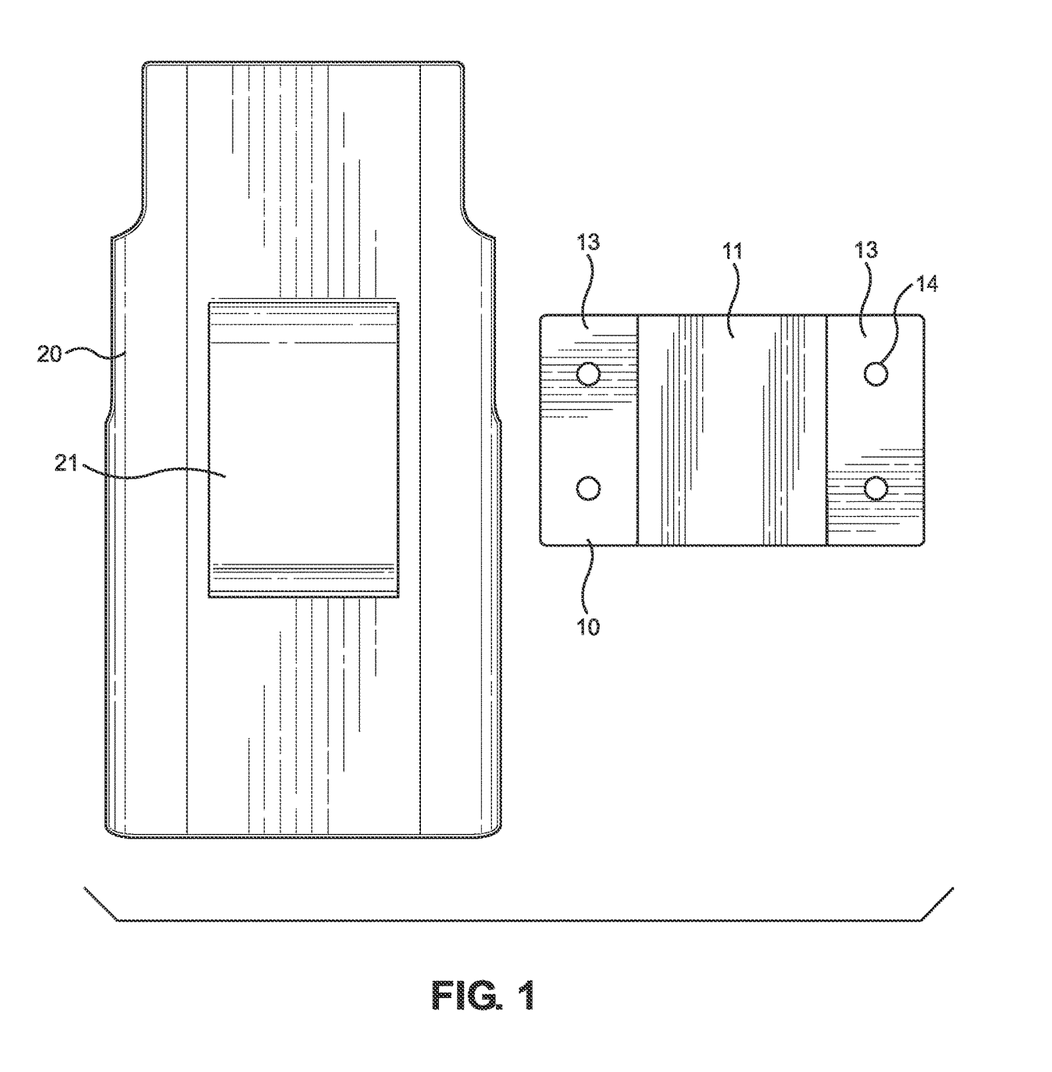
FIG. 1 shows a rear view of the mounting bracket and phone holder from one embodiment of the present invention.
Figure 2:
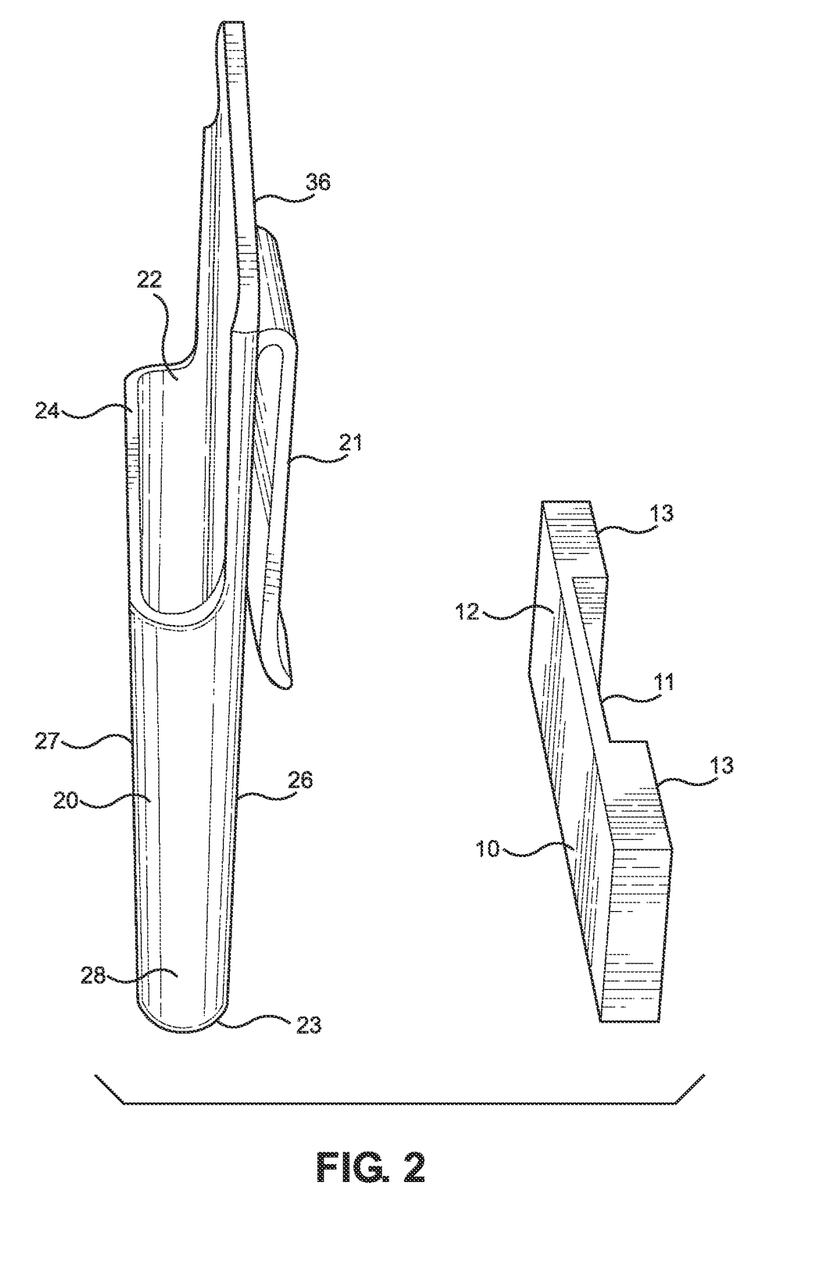
FIG. 2 shows a perspective view of the mounting bracket and phone holder from one embodiment of the present invention.

Referring now to FIGS. 1 and 2, there is shown a rear view and a perspective view of the mounting bracket and phone holder from one embodiment of the present invention. The system includes a holder 20 which includes a base 23, a front wall 27, a rear wall 26, a pair of sidewalls 28, and an upper opening 24 defining a pocket 22 having an interior volume configured to receive a cell phone therein. The cell phone holder 20 can be of a size that fits most smartphones on the market, or can be customized to fit to specific phone models.

The shown embodiment also includes a generally horizontal and planar mounting bracket 10 comprising a pair of planar attachment members 13 and a planar retaining member 12 extending across the pair of attachment members 13. The retaining member 12 and attachment members 13 define a planar slot 11 (See FIG. 1 of the present invention). A clip 21 affixed to the rear wall 26 of the holder 20 is configured to removably engage the slot 11 of the mounting bracket 10 to removably secure the holder 20 to the mounting bracket 10. This allows the user to separate the phone from the bracket 10 without having to remove the phone from the holder 20. The bracket 10 can also include fastener apertures 14 disposed on each attachment member 13. The fastener apertures 14 are configured to receive fasteners, examples of which are shown in FIGS. 6 and 7, which secure the bracket 10 to a garment.

Figure 3:
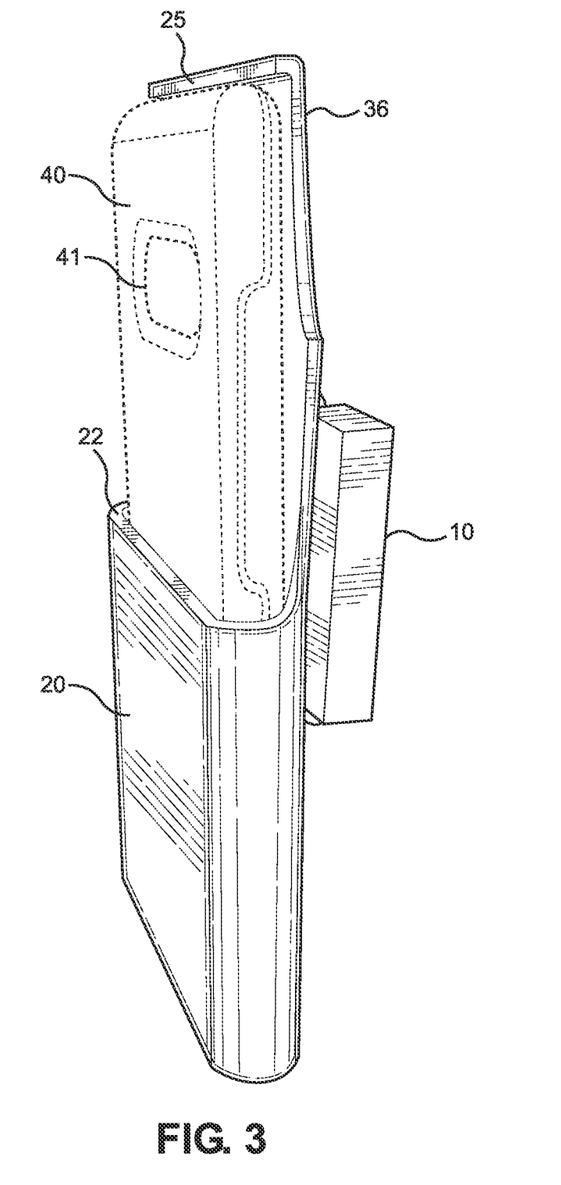
FIG. 3 shows a perspective view of the mounting bracket and phone holder from one embodiment of the present invention, with the phone holder secured to the mounting bracket and supporting a phone.
Figure 4:
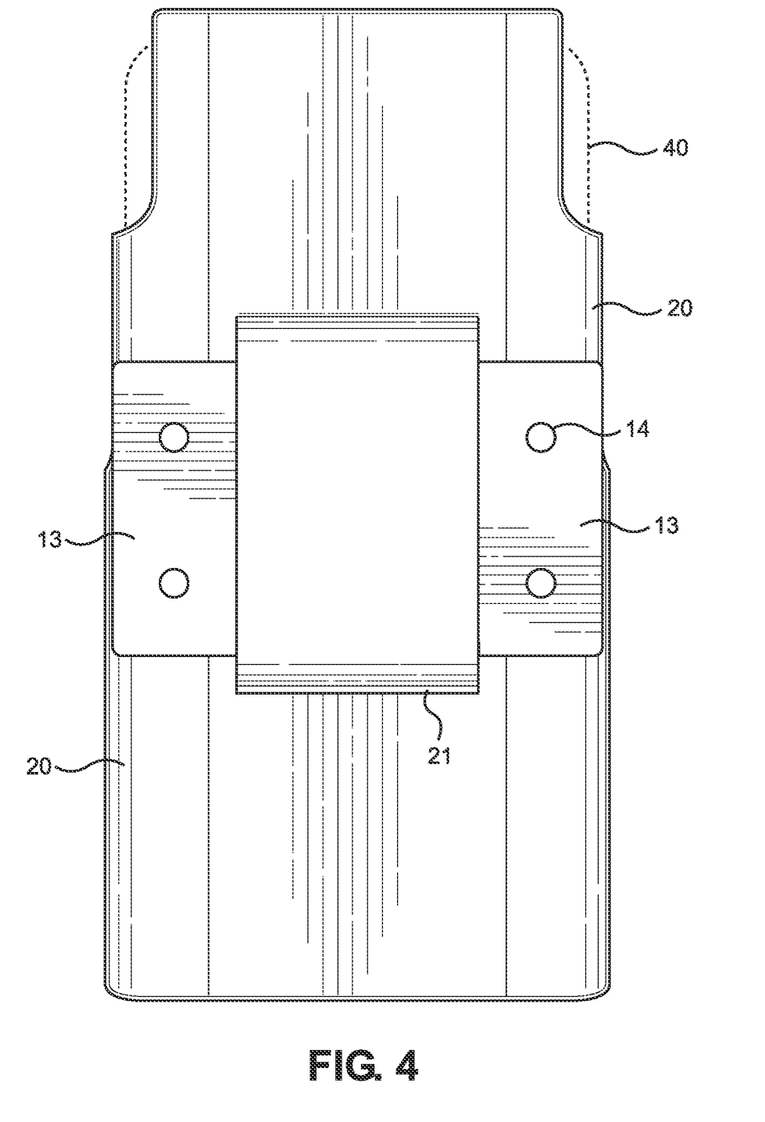
FIG. 4 shows a rear view of the mounting bracket and phone holder from one embodiment of the present invention, with the phone holder secured to the mounting bracket and supporting a phone.

Referring now to FIGS. 3 and 4, there is shown a perspective view and a rear view of the mounting bracket and phone holder from one embodiment of the present invention, with the phone holder secured to the mounting bracket and supporting a phone. In the shown embodiment, an upper portion 36 of the rear wall 26 extends upwardly beyond an upper most edge of the front wall 27. This provides more stable support for the phone secured within the pocket 22. In the shown embodiment, the upper portion 36 of the rear wall 26 comprises a retaining lip 25 that extends toward the front wall 27. The retaining lip 27 is configured to contact an upper edge of a cell phone when the cell phone is positioned within the pocket 22 of the holder 20. This helps to further secure the phone in place.

Figure 5:
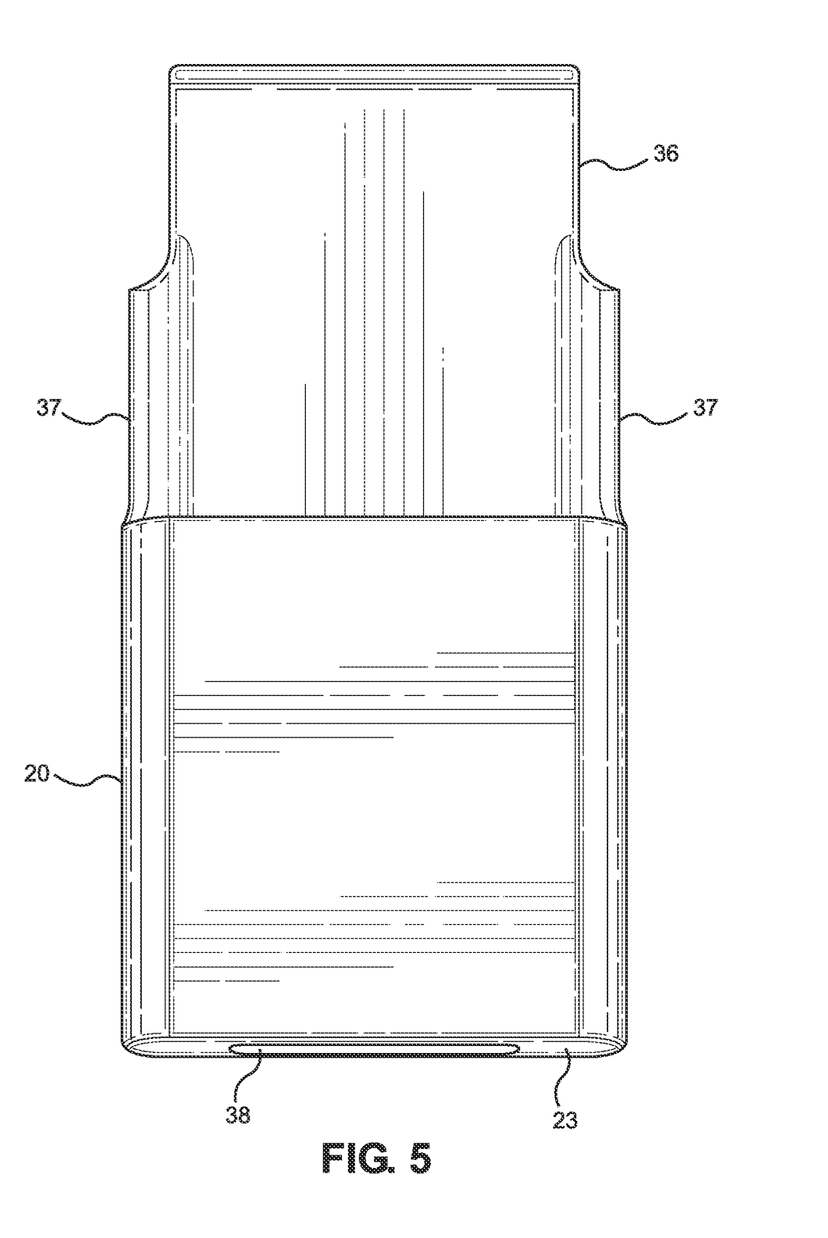
FIG. 5 shows a front view of the phone holder from one embodiment of the present invention.

Referring now to FIG. 5, there is shown a front view of the phone holder from one embodiment of the present invention. The shown embodiment additionally includes a pair of retaining wings 37. Each retaining wing 37 extends forward toward the front wall 25 from a side edge of the upper portion 36 of the rear wall 26 of the holder 20. The retaining wings 37 are configured to contact opposing side edges of a cell phone 40 when the cell phone 40 is positioned within the pocket 22 of the holder 20, further securing the cell phone in place. Further, in order to maintain the most secure connection between the holder 20 and the mounting bracket 10, the upper end of the clip 21 is affixed to the upper portion 26 of the rear wall 36 above the uppermost edge of the front wall 26 of the holder. This distributes the weight of the phone evenly and helps maintain it at a level position so it can be used more effectively as a body camera. Further, the shown embodiment includes an aperture 38 disposed on the base 23 of the holder 20. The aperture allows for charging cables or other connections to be made to the phone while the phone is secured within the holder.

Figure 6:
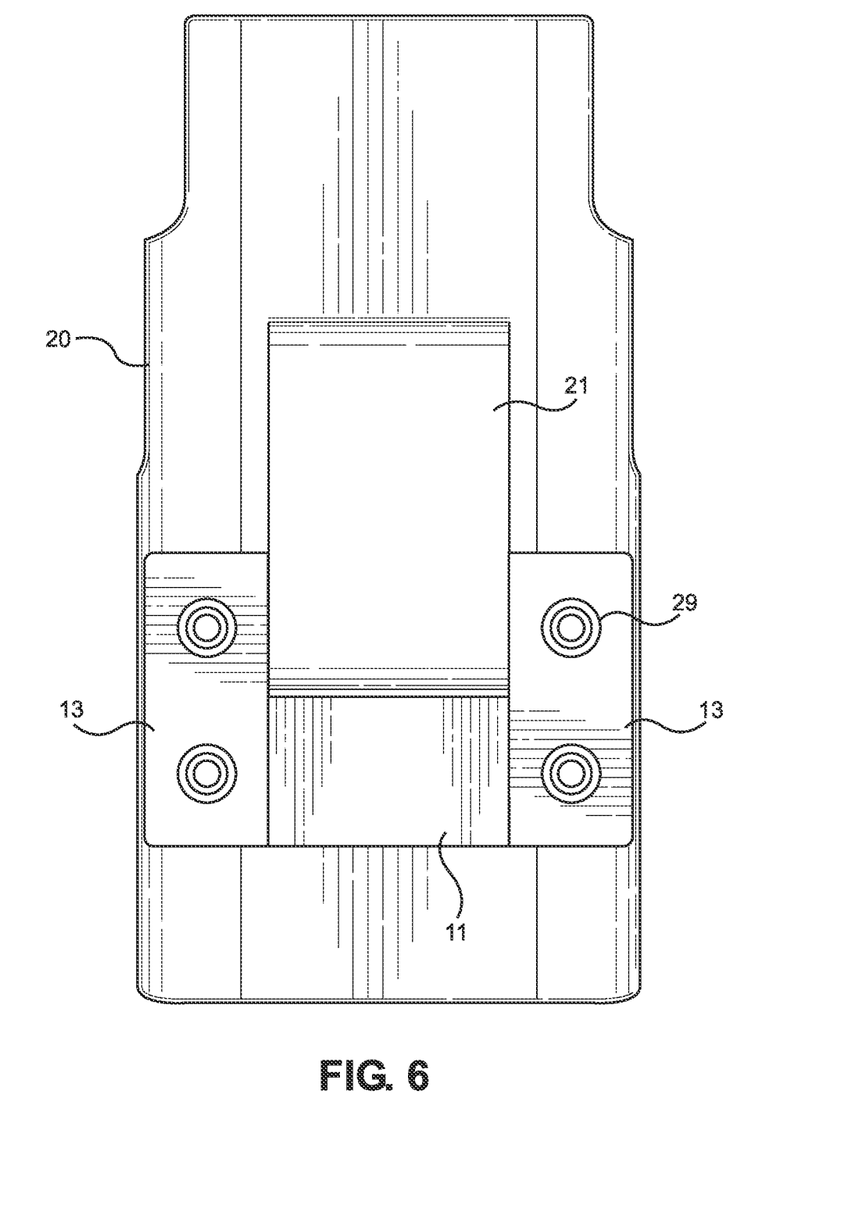
FIG. 6 shows a perspective view of the mounting bracket and phone holder from one embodiment of the present invention, with the phone holder clip partially inserted within the mounting bracket slot.
Figure 7:
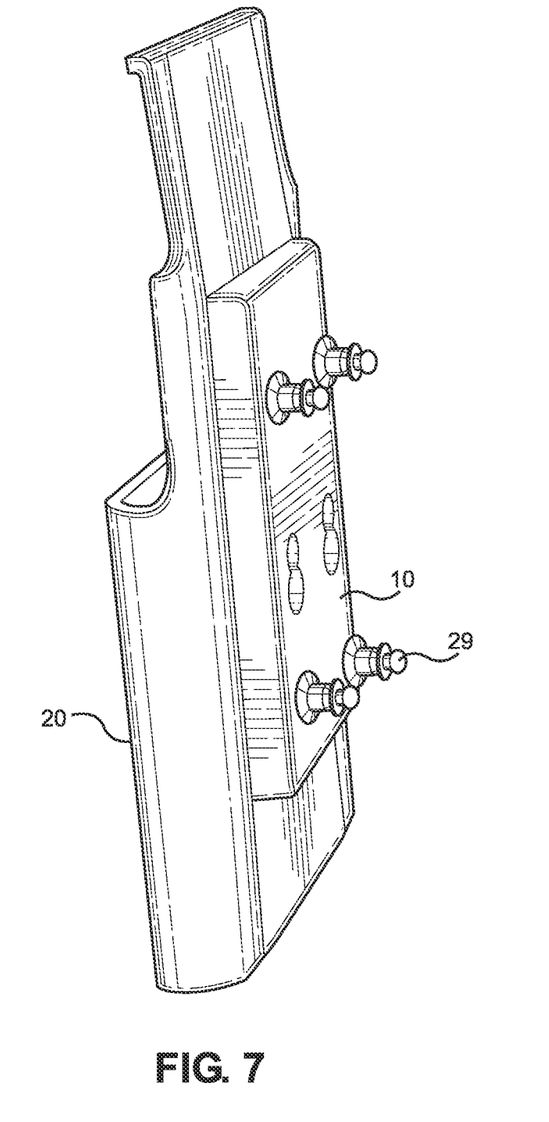
FIG. 7 shows a perspective view of the mounting bracket and phone holder from an alternate embodiment of the present invention.

Referring now to FIG. 6, there is shown a perspective view of the mounting bracket and phone holder from one embodiment of the present invention, with the phone holder clip partially inserted within the mounting bracket slot. A plurality of fasteners 29 are affixed to the pair of attachment members 13. In the shown embodiment, each fastener 29 is a pin, such as a lapel pin, for example, which is configured to pierce a garment to removably secure the mounting bracket 10 to the garment. In other embodiments, any other suitable fasteners may be utilized, so long as each fastener 29 is configured to removably attach the mounting bracket to a garment.

Referring now to FIG. 7, there is shown a perspective view of the mounting bracket and phone holder from an alternate embodiment of the present invention. In the shown embodiment, the mounting bracket 10 is disposed on the rear wall 26 of the holder 20. The holder 20 thus can be integrally formed with the mounting bracket portion 10 on its rear side. In this embodiment, a plurality of fasteners 29 are disposed on the mounting bracket 10. In the shown embodiment, each fastener 29 of the plurality of fasteners is a pin, for example a military-style lapel pin, which is configured to pierce a garment to secure the mounting bracket to the garment.

Figure 8:
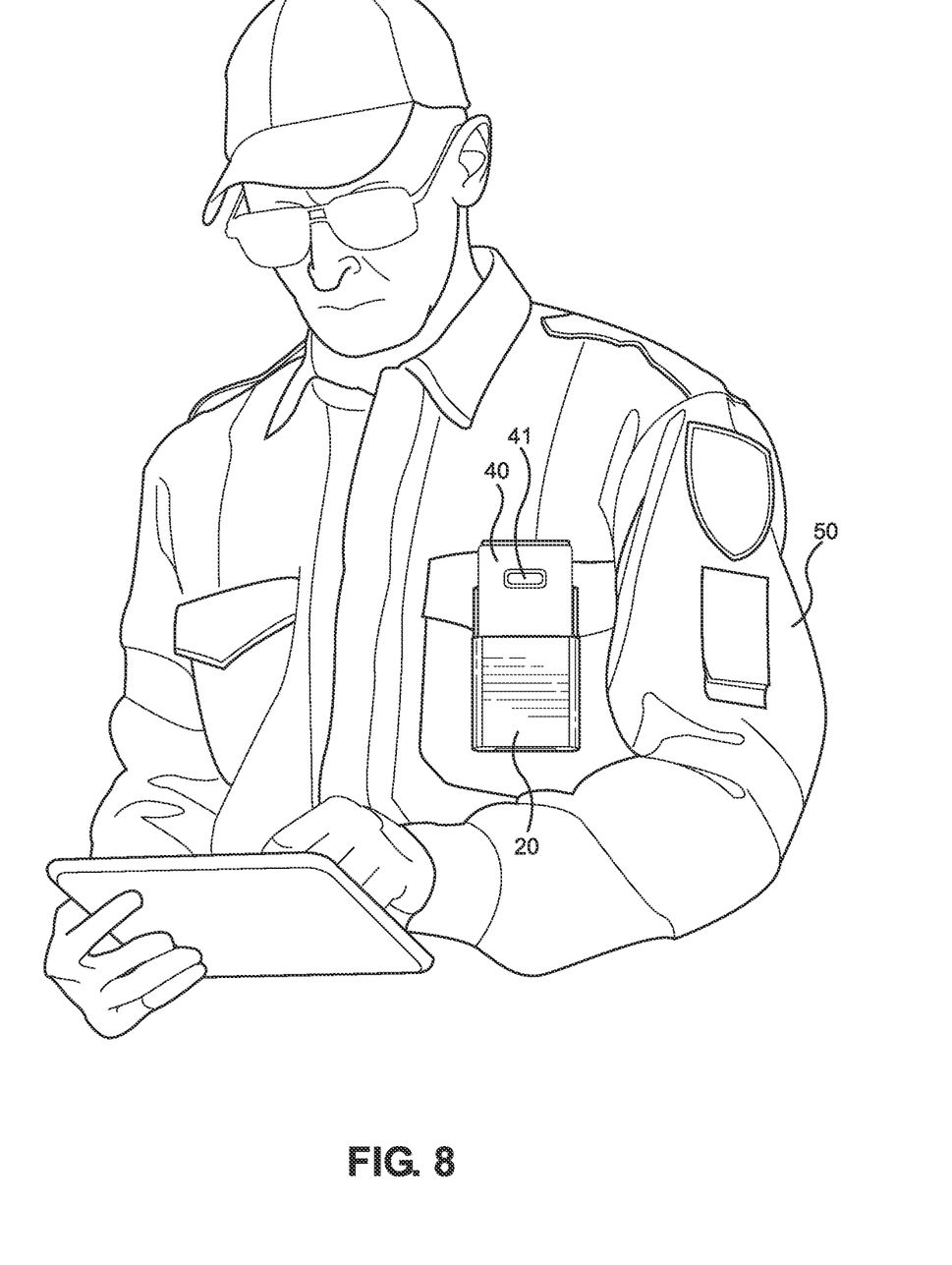
FIG. 8 shows a perspective view of the mounting bracket and phone holder from one embodiment of the present invention in use and secured to a user's clothing.

Referring now to FIG. 8, there is shown a perspective view of the mounting bracket and phone holder from one embodiment of the present invention in use and secured to a user's clothing. In use, the user can utilize the fasteners to secure the mounting bracket to a lapel of a jacket or uniform shirt. However, the user can also secure the mounting bracket to any type of garment 50 worn anywhere on the body. One ideal position is the lapel area because it provides a desired field of view for a recording camera. The cell phone 40 can be secured within the holder 20, such that the camera 41 of the cell phone faces outwardly and forward from the garment 50. In this way, the cell phone can be utilized as a bodily-worn camera. It can be securely attached to the user's clothing for use, such that the phone and holder will not be easy to remove accidentally, yet will be able to be disconnected and used as a regular phone if needed, without needing to remove the phone from the holder.

Figure 9:
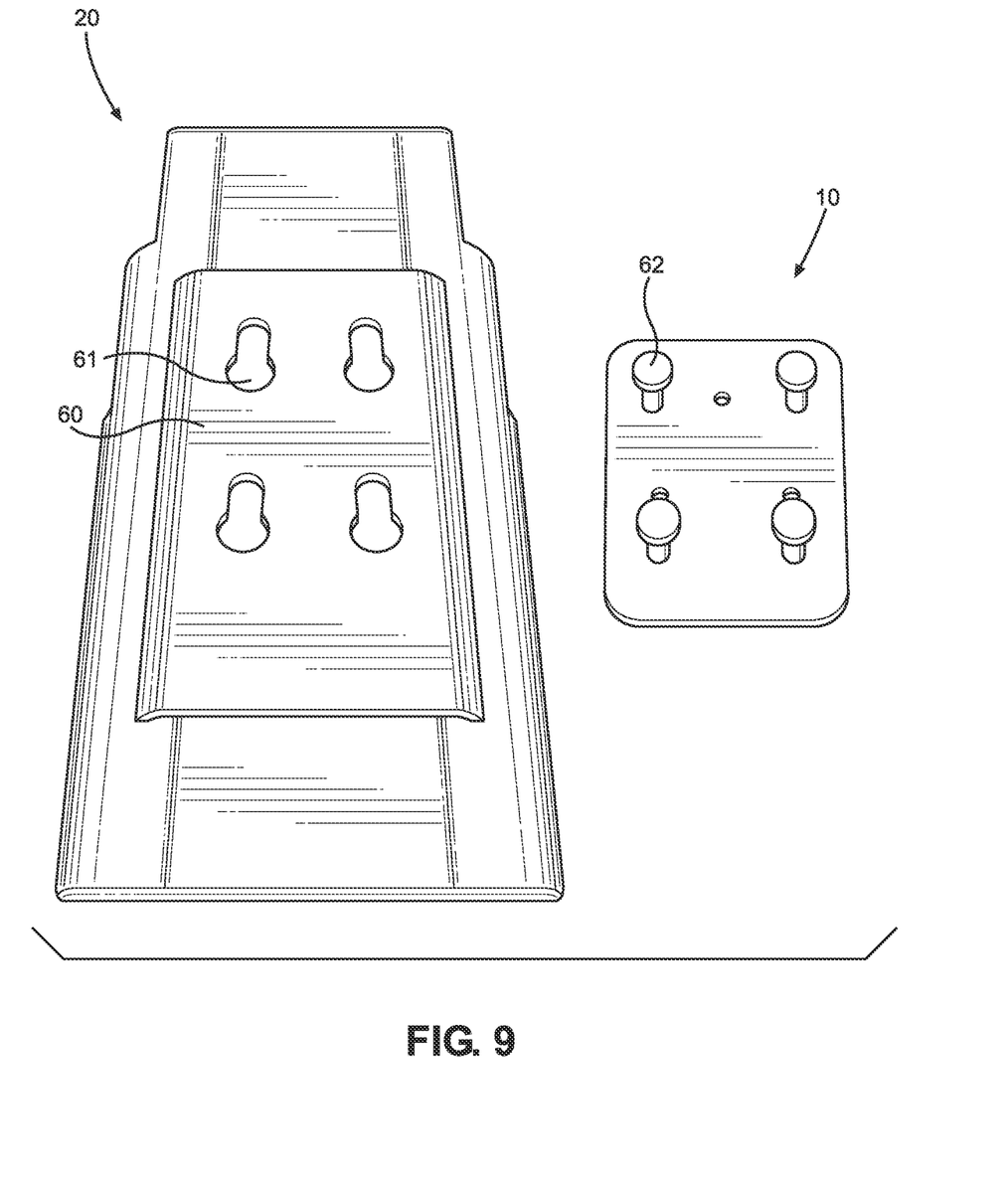
FIG. 9 shows a rear view of the mounting bracket and phone holder from one embodiment of the present invention.

Referring now to FIG. 9, there is shown a rear view of the mounting bracket and phone holder from one embodiment of the present invention. In the illustrated embodiment, the holder 20 comprises a receiving plate 60 on the rear wall of the holder 20. The receiving plate 60 comprises a plurality of receivers 61 thereon. In the illustrated embodiment, the plurality of receivers 61 comprise a plurality of apertures with adjoined slots extending upward thereon. The mounting bracket 10 comprises a plurality of protrusions 62 extending outward therefrom. In the illustrated embodiment, the plurality of protrusions 62 each comprise a column with a head member disposed on a distal end thereof. The plurality of protrusions 62 are configured to removably secure the mounting bracket 10 to the holder 20 via engagement with the plurality of receivers 61.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, and all equivalent relationships to those illustrated in the drawings and described in the specification are intended to be encompassed by the present invention. Therefore, the foregoing is considered as illustrative only of the principles of the invention. Further, it is not desired to limit the invention to the exact construction and operation shown and described, and accordingly, all suitable modifications and equivalents may be resorted to, falling within the scope of the invention.

The invention claimed is:

1. A cell phone holder system, comprising:
a holder comprising a base, a front wall, a rear wall, a pair of sidewalls, and an upper opening defining a pocket having an interior volume configured to receive a cell phone therein;
a generally horizontal and planar mounting bracket comprising a pair of planar attachment members and a planar retaining member extending across the pair of attachment members defining a planar slot;
a clip affixed to the rear wall of the holder and configured to removably engage the planar slot of the mounting bracket to removably secure the holder to the mounting bracket; and
a plurality of fasteners affixed to each attachment member of the pair of attachment members;
wherein each of the fasteners is configured to removably attach the mounting bracket to a garment;
wherein the mounting bracket extends horizontally across the holder;
wherein the base of the holder comprises an aperture thereon;
wherein an upper portion of the rear wall of the holder extends upwardly beyond an uppermost edge of the front wall of the holder;
wherein an upper end of the clip is affixed to the upper portion of the rear wall above the uppermost edge of the front wall of the holder; and
wherein the upper portion of the rear wall comprises a retaining lip that extends toward the front wall, the retaining lip is configured to contact an upper edge of the cell phone when the cell phone is positioned within the pocket of the holder as the cell phone is utilized as a body camera.

2. The cell phone holder system of claim 1, wherein each of the fasteners is a pin configured to pierce the garment to removably secure the mounting bracket to the garment.

3. The cell phone holder system of claim 1, further comprising a pair of retaining wings, wherein each retaining wing extends forwardly toward the front wall from a side edge of the upper portion of the rear wall of the holder, wherein the pair of retaining wings are configured to contact opposing side edges of the cell phone when the cell phone is positioned within the pocket of the holder.

* * * * *